United States Patent
Nagai

(10) Patent No.: US 8,309,902 B2
(45) Date of Patent: Nov. 13, 2012

(54) RECEIVING CIRCUIT FOR OPTICAL COMMUNICATION

(75) Inventor: Takeshi Nagai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 599 days.

(21) Appl. No.: 12/555,995

(22) Filed: Sep. 9, 2009

(65) Prior Publication Data

US 2010/0232808 A1 Sep. 16, 2010

(30) Foreign Application Priority Data

Mar. 13, 2009 (JP) ................. 2009-061191

(51) Int. Cl.
*H04B 10/06* (2006.01)
(52) U.S. Cl. .................... 250/214.1; 398/202
(58) Field of Classification Search ............. 250/214.1, 250/214 R, 208.1; 398/202
See application file for complete search history.

(56) References Cited

U.S. PATENT DOCUMENTS

| 5,990,948 | A * | 11/1999 | Sugiki ............................ 348/250 |
| 6,201,234 | B1 * | 3/2001 | Chow et al. ............. 250/214 LS |
| 7,386,080 | B2 * | 6/2008 | Paillet et al. ................. 375/355 |
| 7,667,181 | B2 * | 2/2010 | Simony ..................... 250/214 R |

FOREIGN PATENT DOCUMENTS

JP 2001-285195 10/2001

OTHER PUBLICATIONS

Japanese Office Action for Japanese Application Serial No. 2009-061191 issued on Jul. 17, 2012.

* cited by examiner

*Primary Examiner* — Seung C Sohn
(74) *Attorney, Agent, or Firm* — Turocy & Watson, LLP

(57) ABSTRACT

A receiving circuit for optical communication includes: a differential circuit, one differential input terminal of which is connected to an anode side of a first photodiode and the other differential input terminal of which is connected to an anode side of a second photodiode; a latch circuit that performs latch operation based on output of the differential circuit; and a flip-flop that performs set operation and reset operation based on a latch state of the latch circuit.

11 Claims, 6 Drawing Sheets

RECEIVING CIRCUIT FOR OPTICAL COMMUNICATION

CROSS-REFERENCE TO RELATED APPLICATIONS

This application is based upon and claims the benefit of priority from the prior Japanese Patent Application No. 2009-61191, filed on Mar. 3, 2009; the entire contents of which are incorporated herein by reference.

BACKGROUND OF THE INVENTION

1. Field of the Invention

The present invention relates to a receiving circuit for optical communication, and, more particularly, is suitably applied to a receiving circuit for optical communication used in complementary optical transmission.

2. Description of the Related Art

In optical communication, photoelectric conversion is performed by using a light receiving element. When the pulse width of signal light is long, current consumption increases because an electric current flows to the light receiving element for a long time. Therefore, there is a method of using a complementary optical wiring circuit to prevent the electric current from flowing to the light receiving element for a long time. The complementary optical wiring circuit transmits only a rising edge (set pulse light) and a falling edge (reset pulse light) of the signal light and restores an original signal from the rising edge and the falling edge.

For example, Japanese Patent Application Laid-Open No. 2001-285195 discloses a method for suppressing output drift of a complementary optical wiring circuit. The complementary optical wiring circuit includes first and second diode-type light emitting elements serially connected to each other, a coupling capacitor connected to a connection point of the first and second diode-type light emitting elements, a pulse signal source for alternately applying a differential waveform signal to the first and second diode-type light emitting elements via the coupling capacitor, and a DC bias voltage source connected between an anode of the first diode-type light emitting element and a cathode of the second diode-type light emitting element.

However, the receiving circuit for optical communication in the past performs photoelectric conversion for the set pulse light and photoelectric conversion for the reset pulse light independently from each other. Therefore, when noise rides on the set pulse light or the reset pulse light during the transmission of the set pulse light and the reset pulse light, the noise cannot be eliminated.

BRIEF SUMMARY OF THE INVENTION

A receiving circuit for optical communication according to an embodiment of the present invention comprises: a first photodiode that receives a set pulse corresponding to a rising edge of signal light; a second photodiode that receives a reset pulse corresponding to a falling edge of the signal light; a differential circuit, one differential input terminal of which is connected to an anode side of the first photodiode and the other differential input terminal of which is connected to an anode side of the second photodiode; a latch circuit that performs latch operation based on output of the differential circuit; and a flip-flop that performs set operation and reset operation based on a latch state of the latch circuit.

DETAILED DESCRIPTION OF THE INVENTION

Exemplary embodiments of the present invention are explained in detail below with reference to the accompanying drawings. The present invention is not limited to the following embodiments.

Figure 1:
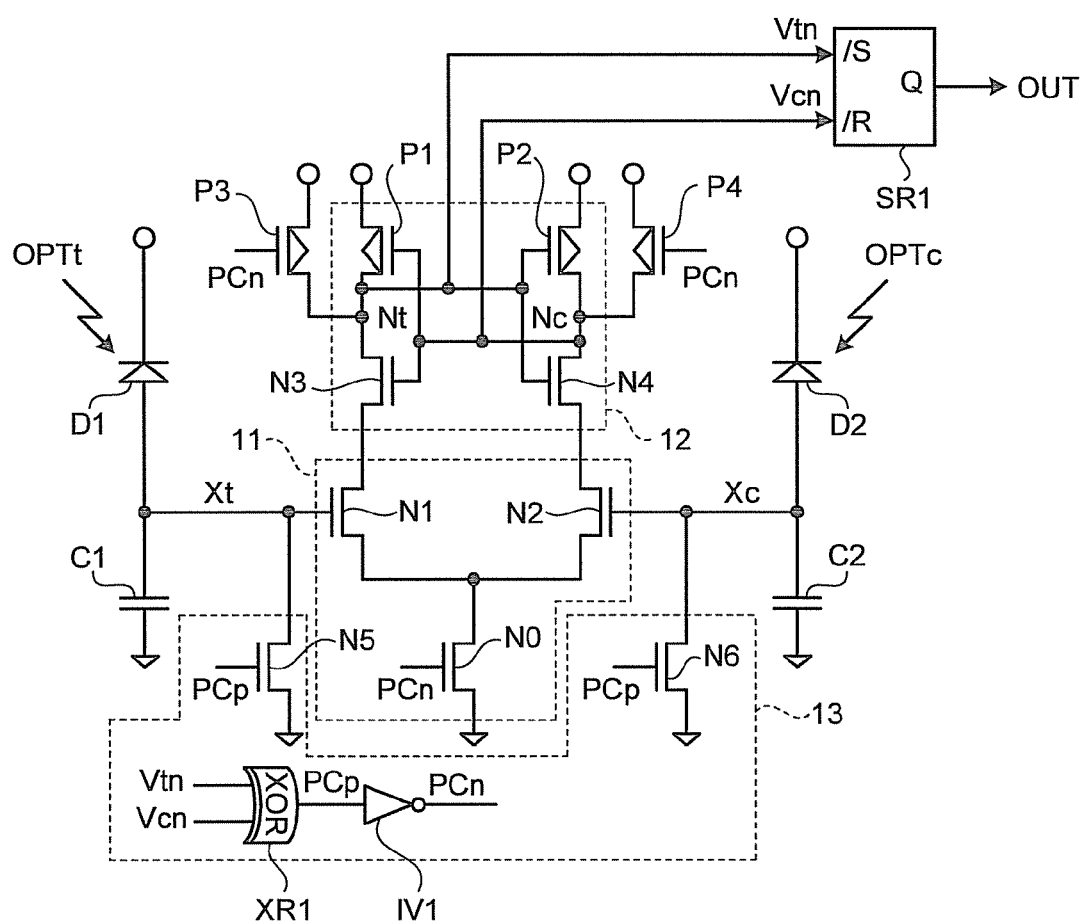
FIG. 1 is a block diagram of a schematic configuration of a receiving circuit for optical communication according to a first embodiment of the present invention.

FIG. 1 is a block diagram of a schematic configuration of a receiving circuit for optical communication according to a first embodiment of the present invention.

In FIG. 1, the receiving circuit for optical communication includes photodiodes D1 and D2. The photodiode D1 can receive set pulse light OPTt corresponding to a rising edge of signal light. The photodiode D2 can receive reset pulse light OPTc corresponding to a falling edge of the signal light.

The receiving circuit for optical communication also includes a differential circuit 11 to which the outputs from the photodiodes D1 and D2 are given as differential inputs, a latch circuit 12 that performs latch operation based on the output of the differential circuit 11, a flip-flop SR1 that performs set operation and reset operation based on a latch state of the latch circuit 12, a pre-charge circuit 13 that shifts, based on the latch state of the latch circuit 12, the potentials of both differential input terminals of the differential circuit 11 to a state in which the signal light is not input.

The differential circuit 11 includes N-channel field effect transistors (hereinafter, "Nch transistors") N0 to N2. A drain of the Nch transistor N0 is connected to sources of the Nch transistors N1 and N2 and a source thereof is grounded. A gate of the Nch transistor N1 is connected to an anode of the photodiode D1 and connected to a capacitor C1. A gate of the Nch transistor N2 is connected to an anode of the photodiode D2 and connected to a capacitor C2.

The latch circuit 12 includes Nch transistors N3 and N4 and P-channel field effect transistors (hereinafter, "Pch transistors") P1 and P2. The Nch transistor N3 and the Pch transistor P1 configure an inverter with gates and drains thereof connected in common to each other. The Nch transistor N4 and the Pch transistor P2 configure an inverter with gates and drains thereof connected in common to each other. The pair of inverters are cross-coupled with an input of one inverter connected to an output of the other inverter and an output of one inverter connected to an input of the other inverter to form storage nodes Nt and Nc of the latch circuit 12.

The drain of the Nch transistor N3, the drain of the Pch transistor P1, the gate of the Nch transistor N4, and the gate of the Pch transistor P2 are connected to a set terminal of the flip-flop SR1. The drain of the Nch transistor N4, the drain of the Pch transistor P2, the gate of the Nch transistor N3, and the gate of the Pch transistor P1 are connected to a reset terminal of the flip-flop SR1.

The drain of the Nch transistor N3 and the drain of the Pch transistor P1 are connected to the drain of the Pch transistor P3. The drain of the Nch transistor N4 and the drain of the Pch transistor P2 are connected to the drain of the Pch transistor P4.

The pre-charge circuit 13 includes Nch transistors N5 and N6, an exclusive OR circuit XR1, and an inverter IV1. A drain of the Nch transistor N5 is connected to the gate of the Nch transistor N1. A drain of the Nch transistor N6 is connected to the gate of the Nch transistor N2.

The drains of the Nch transistor N3 and the Pch transistor P1 and the gates of the Nch transistor N4 and the Pch transistor P2 are connected to one input terminal of the exclusive OR circuit XR1. The drain of the Nch transistor N4, the drain of the Pch transistor P2, the gate of the Nch transistor N3, and the gate of the Pch transistor P1 are connected to the other input terminal of the exclusive OR circuit XR1.

An output terminal of the exclusive OR circuit XR1 is connected to gates of the Nch transistors N5 and N6. The output terminal of the exclusive OR circuit XR1 is connected to gates of the Nch transistor N0 and the Pch transistors P3 and P4 via the inverter IV1.

Figure 2:
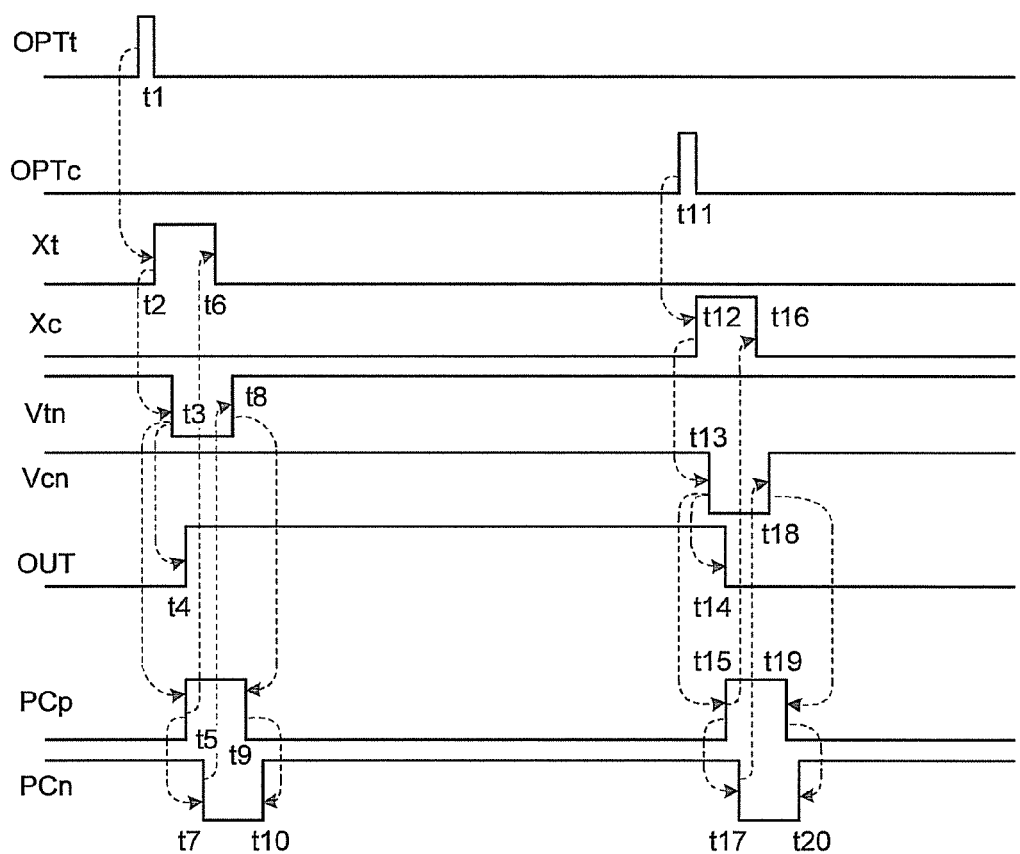
FIG. 2 is a timing chart of the operation of the receiving circuit for optical communication shown in FIG. 1.

FIG. 2 is a timing chart of the operation of the receiving circuit for optical communication shown in FIG. 1.

In FIG. 2, it is assumed that input voltages Xt and Xc to the differential circuit 11 is at a low level and output voltages Vtn and Vcn from the latch circuit 12 are at a high level. Output voltage PCp is at the low level and output voltage PCn is at the high level.

The Nch transistors N5 and N6 and the Pch transistors P3 and P4 are turned off and the Nch transistor N0 is turned on. As a result, the differential circuit 11 is maintained in a state in which differential operation is possible and the latch circuit 12 is maintained in a state in which latch operation is possible.

When the set pulse light OPTt is made incident on the photodiode D1 (t1), the set pulse light OPTt is photoelectrically converted. The input voltage Xt changes from the low level to the high level (t2). When the gate potential of the Nch transistor N1 changes to the high level, the Nch transistor N1 is turned on. When the output voltage Vcn is at the high level, the Nch transistor N3 is turned on. Therefore, the output voltage Vtn changes to the low level (t3).

When the output voltage Vtn changes to the low level, output voltage out changes from the low level to the high level (t4). The output voltage PCp changes from the low level to the high level (t5). Then, the Nch transistors N5 and N6 are turned on. The input voltage Xt changes from the high level to the low level (t6). The input voltage Xc is maintained at the low level.

When the output voltage PCp changes from the low level to the high level, the output voltage PCn changes from the high level to the low level (t7). Then, the Nch transistor N0 is turned off and the Pch transistors P3 and P4 are turned on. The output voltage Vtn changes from the low level to the high level (t8). The output voltage Vcn is maintained at the high level.

When the output voltage Vtn changes to the high level, the output voltage PCp changes from the high level to the low level (t9). Then, the Nch transistors N5 and N6 are turned off. The output voltage PCn changes from the low level to the high level (t10). The Nch transistor N0 is turned on and the Pch transistors P3 and P4 are turned off.

When the reset pulse light OPTc is made incident on the photodiode D2 (t11), the reset pulse light Optic is photoelectrically converted. The input voltage Xc changes from the low level to the high level (t12). The gate potential of the Nch transistor N2 is at the high level and the Nch transistor N2 is turned on. When the output voltage Vtn is at the high level, the Nch transistor N4 is turned on. Therefore, the output voltage Vcn changes to the low level (t13).

When the output voltage Vcn changes to the low level, the output voltage out changes from the high level to the low level (t14). The original signal light is restored. The output voltage PCp changes from the low level to the high level (t15). Then, the Nch transistors N5 and N6 are turned on. The input voltage Xc changes from the high level to the low level (t16). The input voltage Xt is maintained at the low level.

When the output voltage PCp changes from the low level to the high level, the output voltage PCn changes from the high level to the low level (t17). Then, the Nch transistor N0 is turned off and the Pch transistors P3 and P4 are turned on. The output voltage Vcn changes from the low level to the high level (t18). The output voltage Vtn is maintained at the high level.

When the output voltage Vcn changes to the high level, the output voltage PCp changes from the high level to the low level (t19). Then, the Nch transistors N5 and N6 are turned off. The output voltage PCn changes from the low level to the high level (t20). The Nch transistor N0 is turned on and the Pch transistors P3 and P4 are turned off.

Consequently, when the set pulse light OPTt and the reset pulse light Optic are not input, it is possible to interrupt all current paths of the receiving circuit for optical communication and realize a reduction is power consumption.

The outputs from the photodiodes D1 and D2 are given to the differential circuit 11 as the differential inputs. Therefore, it is possible to eliminate common mode noise superimposed on the set pulse light OPTt and the reset pulse light OPTc and improve noise resistance in complementary optical transmission.

Figure 3:
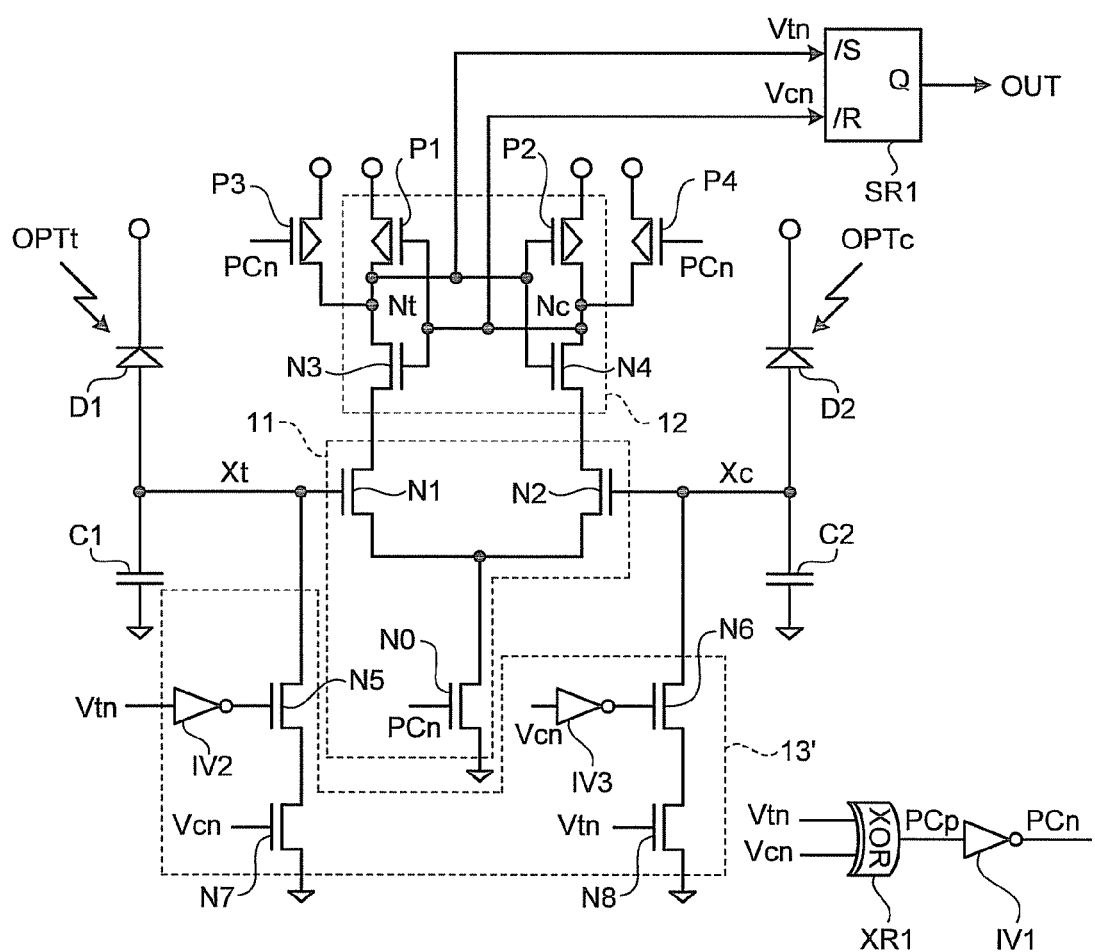
FIG. 3 is a block diagram of a schematic configuration of a receiving circuit for optical communication according to a second embodiment of the present invention.

FIG. 3 is a block diagram of a schematic configuration of a receiving circuit for optical communication according to a second embodiment of the present invention.

In FIG. 3, the receiving circuit for optical communication includes a pre-charge circuit 13' instead of the pre-charge circuit 13 shown in FIG. 1. The pre-charge circuit 13' includes Nch transistors N5 to N8 and inverters IV2 and IV3. The Nch transistor N7 is connected in series to the Nch transistor N5. Nch transistor N8 is connected in series to the Nch transistor N6.

The drain of the Nch transistor N3, the drain of the Pch transistor P1, the gate of the Nch transistor N4, and the gate of the Pch transistor P2 are connected to a gate of the Nch transistor N5 via the inverter IV2. The drain of the Nch transistor N3, the drain of the Pch transistor P1, the gate of the Nch transistor N4, and the gate of the Pch transistor P2 are connected to a gate of the Nch transistor N8.

The drain of the Nch transistor N4, the drain of the Pch transistor P2, the gate of the Nch transistor N3, and the gate of the Pch transistor P1 are connected to a gate of the Nch transistor N6 via the inverter IV3. The drain of the Nch transistor N4, the drain of the Pch transistor P2, the gate of the Nch transistor N3, and the gate of the Pch transistor P1 are connected to a gate of the Nch transistor N7.

Figure 4:
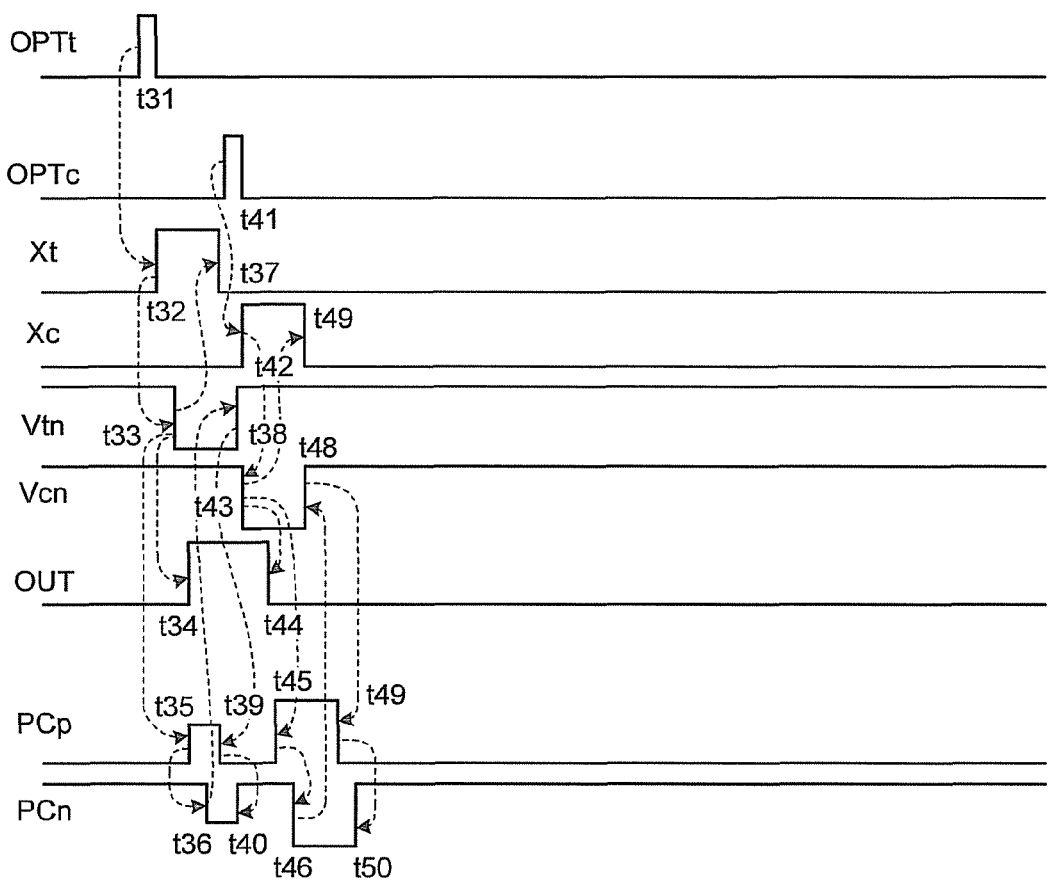
FIG. 4 is a timing chart of the operation of the receiving circuit for optical communication shown in FIG. 3.

FIG. 4 is a timing chart of the operation of the receiving circuit for optical communication shown in FIG. 3.

In FIG. 4, it is assumed that the input voltage Xt and Xc to the differential circuit 11 are at a low level and the output voltages Vtn and Vcn from the latch circuit 12 are at a high level. The output voltage PCp is at the low level and the output voltage PCn is at the high level.

The Pch transistors P3 and P4 are turned off and the Nch transistors N0, N7, and N8 are turned on. The Nch transistors N5 and N6 are turned off.

As a result, the differential circuit 11 is maintained in a state in which differential operation is possible. The latch circuit 12 is maintained in a state in which latch operation is possible.

When the set pulse light OPTt is made incident on the photodiode D1 (t31), the set pulse light OPTt is photoelectrically converted. The input voltage Xt changes from the low level to the high level (t32). When the gate potential of the Nch transistor N1 changes to the high level, the Nch transistor N1 is turned on. When the output voltage Vcn is at the high level, the Nch transistor N3 is turned on. Therefore, the output voltage Vtn changes to the low level (t33).

When the output voltage Vtn changes to the low level, the output voltage out changes from the low level to the high level (t34). The output voltage PCp changes from the low level to the high level (t35). Then, the output voltage PCn changes from the high level to the low level (t36).

When the output voltage Vtn changes to the low level, the Nch transistor N5 is turned on. The input voltage Xt changes from the high level to the low level (t37). As a result, the Nch transistor N1 is turned off in a state in which the Nch transistors N5 and N7 are on. The capacitor C1 is pre-charged.

When the output voltage PCn changes from the high level to the low level, the Nch transistor N0 is turned off and the Pch transistors P3 and P4 are turned on. The output voltage Vtn changes from the low level to the high level (t38). The output voltage Vcn is maintained at the high level.

When the output voltage Vtn changes to the high level, the output voltage PCp changes from the high level to the low level (t39). Then, the output voltage PCn changes from the low level to the high level (t40). The Nch transistor N0 is turned on and the Pch transistors P3 and P4 are turned off.

When the reset pulse light OPTc is made incident on the photodiode D2 (t41), the reset pulse light Optic is photoelectrically converted. The input voltage Xc changes from the low level to the high level (t42). The gate potential of the Nch transistor N2 changes to the high level and the Nch transistor N2 is turned on. When the output voltage Vtn is at the high level, the Nch transistor N4 is turned on. Therefore, the output voltage Vcn changes to the low level (t43).

When the output voltage Vcn changes to the low level, the output voltage out changes from the high level to the low level (t44). The original signal light is restored. The output voltage PCp changes from the low level to the high level (t45). Then, the output voltage PCn changes from the high level to the low level (t46).

When the output voltage Vcn changes to the low level, the Nch transistor N6 is turned on. The input voltage Xc changes from the high level to the low level (t47). As a result, the Nch transistor N2 is turned off in a state in which the Nch transistors N6 and N8 are on. The capacitor C2 is pre-charged.

When the output voltage PCn changes from the high level to the low level, the Nch transistor N0 is turned off and the Pch transistors P3 and P4 are turned on. The output voltage Vcn changes from the low level to the high level (t48). The output voltage Vtn is maintained at the high level.

When the output voltage Vcn changes to the high level, the output voltage PCp changes from the high level to the low level (t49). Then, the output voltage PCn changes from the low level to the high level (t50). The Nch transistor N0 is turned on and the Pch transistors P3 and P4 are turned off.

Consequently, immediately after the set pulse light OPTt is made incident on the photodiode D1, only the capacitor C1 can be pre-charged. The capacitor C2 can be prevented from being pre-charged. Therefore, even when the reset pulse light Optic is made incident on the photodiode D2, the reset pulse light Optic can be detected by the differential circuit 11. It is possible to realize a reduction in power consumption while preventing operation speed from being limited by the pre-charge.

Figure 5:
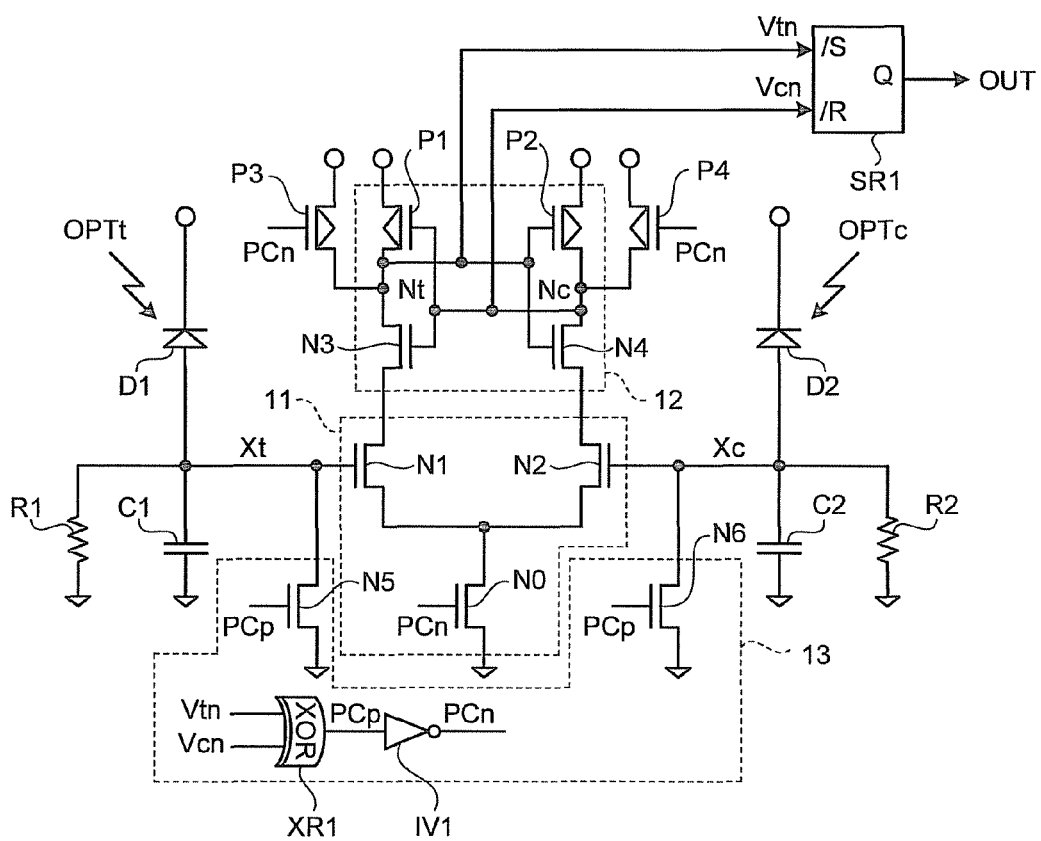
FIG. 5 is a block diagram of a schematic configuration of a receiving circuit for optical communication according to a third embodiment of the present invention.

FIG. 5 is a block diagram of a schematic configuration of a receiving circuit for optical communication according to a third embodiment of the present invention.

In FIG. 5, the receiving circuit for optical communication includes resistors R1 and R2 in addition to the components of the receiving circuit for optical communication shown in FIG. 1. The resistor R1 is connected to the gate of the Nch transistor N1 and the resistor R2 is connected to the gate of the Nch transistor N2.

Figure 6:
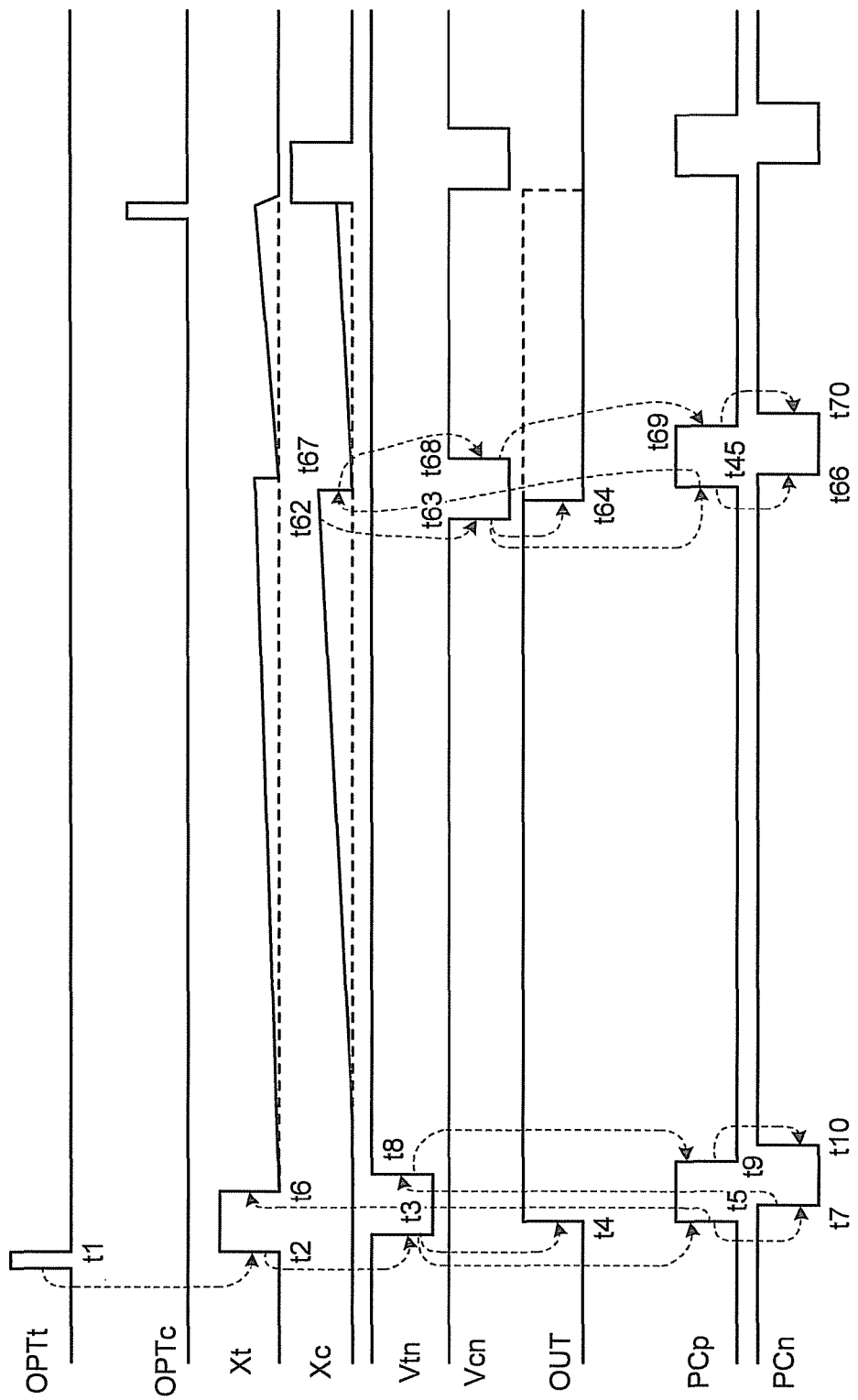
FIG. 6 is a timing chart of the operation of the receiving circuit for optical communication shown in FIG. 5.

FIG. 6 is a timing chart of the operation of the receiving circuit for optical communication shown in FIG. 5.

In FIG. 6, it is assumed that the input voltages Xt and Xc to the differential circuit 11 are at a low level and the output voltages Vtn and Vcn from the latch circuit 12 are at a high level. The output voltage PCp is at the low level and the output voltage PCn from the inverter IV1 is at the high level.

The Nch transistors N5 and N6 and the Pch transistors P3 and P4 are turned off and the Nch transistor N0 is turned on.

When the resistors R1 and R2 are not provided, if leakage due to dark currents occurs in the photodiodes D1 and D2, the potentials of the input voltages Xt and Xc gradually rise. When the input voltage Xt reaches threshold voltage of the Nch transistor N2 (t62), the Nch transistor N2 is turned on. When the output voltage Vtn is at the high level, the Nch transistor N4 is turned on. Therefore, the output voltage Vcn changes to the low level (t63).

When the output voltage Vcn changes to the low level, the output voltage out changes from the high level to the low level (t64). The original signal light is restored. The output voltage PCp changes from the low level to the high level (t65). Then, the Nch transistors N5 and N6 are turned on. The input voltage Xc changes from the high level to the low level (t66). The input voltage Xt is maintained at the low level.

When the output voltage PCp changes from the low level to the high level, the output voltage PCn changes from the high level to the low level (t67). Then, the Nch transistor N0 is turned off and the Pch transistors P3 and P4 are turned on. The output voltage Vcn changes from the low level to the high level (t68). The output voltage Vtn is maintained at the high level.

When the output voltage Vtn changes to the high level, the output voltage PCp changes from the high level to the low level (t69). Then, the Nch transistors N5 and N6 are turned off. The output voltage PCn changes from the low level to the high level (t70). The Nch transistor N0 is turned on and the Pch transistors P3 and P4 are turned off.

As a result, regardless of the fact that the reset pulse light Optic is not made incident on the photodiode D2, the output voltage out changes from the high level to the low level to cause malfunction.

On the other hand, when the resistors R1 and R2 are provided, dark currents in the photodiodes D1 and D2 are caused to escape via the resistors R1 and R2, respectively. Therefore, even when leakage due to the dark currents occurs in the photodiodes D1 and D2, it is possible to prevent the potentials of the input voltages Xt and Xc from gradually rising and prevent malfunction of the receiving circuit for optical communication.

In the receiving circuit for optical communication according to the first embodiment shown in FIG. 1, the pre-charge circuit 13 and the Pch transistors P3 and P4 are provided.

However, the pre-charge circuit 13 and the Pch transistors P3 and P4 do not have to be provided.

In the receiving circuit for optical communication according to the third embodiment shown in FIG. 5, the resistors R1 and R2 are provided in addition to the components of the receiving circuit for optical communication according to the first embodiment shown in FIG. 1. However, the resistors R1 and R2 can be provided in addition to the components of the receiving circuit for optical communication according to the second embodiment shown in FIG. 3. Alternatively, the resistors R1 and R2 can be provided in the receiving circuit for optical communication according to the first embodiment shown in FIG. 1 from which the pre-charge circuit 13 and the Pch transistors P3 and P4 are removed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A receiving circuit for optical communication comprising:
    a first photodiode that receives a set pulse corresponding to a rising edge of signal light;
    a second photodiode that receives a reset pulse corresponding to a falling edge of the signal light;
    a differential circuit, one differential input terminal of which is connected to an anode side of the first photodiode and the other differential input terminal of which is connected to an anode side of the second photodiode;
    a latch circuit that performs latch operation based on output of the differential circuit; and
    a flip-flop that performs set operation and reset operation based on a latch state of the latch circuit.

2. The receiving circuit for optical communication according to claim 1, further comprising:
    a first resistor connected to one differential input terminal of the differential circuit; and
    a second resistor connected to the other differential input terminal of the differential circuit.

3. The receiving circuit for optical communication according to claim 1, wherein the differential circuit includes:
    a first field effect transistor, to a gate of which the anode of the first photodiode is connected;
    a second field effect transistor, to a gate of which the anode of the second photodiode is connected; and
    a third field effect transistor, a drain of which is connected to a source of the first field effect transistor and a source of the second field effect transistor, the third field effect transistor being turned on and off based on the latch state of the latch circuit.

4. The receiving circuit for optical communication according to claim 1, further comprising a pre-charge circuit that shifts, based on the latch state of the latch circuit, potentials of both the differential input terminals of the differential circuit to a state in which the signal light is not input.

5. The receiving circuit for optical communication according to claim 4, wherein the pre-charge circuit includes:
    a first field effect transistor, to a drain of which the anode of the first photodiode is connected, the first field effect transistor being turned on and off based on the latch state of the latch circuit; and
    a second field effect transistor, to a drain of which the anode of the second photodiode is connected, the second field effect transistor being turned on and off based on the latch state of the latch circuit.

6. The receiving circuit for optical communication according to claim 5, further comprising:
    a first capacitor connected to the anode of the first photodiode; and
    a second capacitor connected to the anode of the second photodiode.

7. The receiving circuit for optical communication according to claim 1, wherein the latch circuit includes a pair of inverters in which a pair of storage nodes are formed with an input of one inverter connected to an output of the other inverter and an output of one inverter connected to an input of the other inverter.

8. The receiving circuit for optical communication according to claim 7, further comprising a pre-charge circuit that shifts, based on the latch state of the latch circuit, potential of the differential input terminal only on one side of the differential circuit to a state in which the signal light is not input.

9. The receiving circuit for optical communication according to claim 8, wherein the pre-charge circuit includes:
    a first inverter that inverts potential of one storage node of the latch circuit;
    a second inverter that inverts potential of the other storage node of the latch circuit;
    a first field effect transistor, to a drain of which the anode of the first photodiode is connected, the first field effect transistor being turned on and off based on output of the first inverter;
    a second field effect transistor connected in series to the first field effect transistor, a gate of the second field effect transistor being connected to the other storage node of the latch circuit;
    a third field effect transistor, to a drain of which the anode of the second photodiode is connected, the third field effect transistor being turned on and off based on output of the second inverter; and
    a fourth field effect transistor connected in series to the third field effect transistor, a gate of the third field effect transistor being connected to one storage node of the latch circuit.

10. The receiving circuit for optical communication according to claim 9, further comprising:
    a first capacitor connected to the anode of the first photodiode; and
    a second capacitor connected to the anode of the second photodiode.

11. The receiving circuit for optical communication according to claim 7, further comprising a transistor that fixes, based on the latch state of the latch circuit, output of the latch circuit to predetermined potential.

* * * * *